United States Patent
Seydoux

(10) Patent No.: US 8,054,987 B2
(45) Date of Patent: Nov. 8, 2011

(54) SYSTEM FOR WIRELESS AUDIO SIGNAL DISTRIBUTION BETWEEN A PLURALITY OF ACTIVE LOUDSPEAKERS

(76) Inventor: Henri Seydoux, Paris (FR)

( * ) Notice: Subject to any disclaimer, the term of this patent is extended or adjusted under 35 U.S.C. 154(b) by 1332 days.

(21) Appl. No.: 11/646,569

(22) Filed: Dec. 28, 2006

(65) Prior Publication Data
US 2007/0160225 A1 Jul. 12, 2007

(30) Foreign Application Priority Data
Dec. 29, 2005 (FR) ..................... 05 13448

(51) Int. Cl.
*H04B 5/00* (2006.01)
*H04B 3/00* (2006.01)

(52) U.S. Cl. .......................... 381/79; 381/77

(58) Field of Classification Search .............. 381/77–85; 700/94
See application file for complete search history.

(56) References Cited

U.S. PATENT DOCUMENTS

| | | | | |
|---|---|---|---|---|
| 5,406,634 A * | 4/1995 | Anderson et al. | ............... | 381/82 |
| 5,946,343 A * | 8/1999 | Schotz et al. | ............... | 375/141 |
| 6,826,283 B1 * | 11/2004 | Wheeler et al. | ............... | 381/77 |
| 7,643,894 B2 * | 1/2010 | Braithwaite et al. | ............ | 700/94 |
| 2005/0044372 A1 | 2/2005 | Aull et al. | | |
| 2005/0177256 A1 * | 8/2005 | Shintani et al. | ............... | 700/94 |
| 2005/0190928 A1 | 9/2005 | Noto | | |
| 2006/0182288 A1 * | 8/2006 | Arcaria et al. | ................. | 381/82 |

FOREIGN PATENT DOCUMENTS
WO 03/096741 11/2003

OTHER PUBLICATIONS
French Search Report for FR 0513448 completion date of search Sep. 13, 2006.

* cited by examiner

*Primary Examiner* — Xu Mei
(74) *Attorney, Agent, or Firm* — Nixon & Vanderhye P.C.

(57) ABSTRACT

Each loudspeaker (10, 10') comprises means, e.g. of the Bluetooth type, for establishing a wireless interface with every other loudspeaker of the system. The network configures itself automatically by each loudspeaker searching for the other loudspeakers with which a wireless link can be established directly, by drawing up a table of mutual visibilities, and, on the basis of said table, defining a hierarchical network topology. One of the loudspeakers is designated as the network head so as to be capable of searching for and setting up a wireless link with a remote peripheral capable of transmitting a coded audio signal (A2DP) and/or a control signal (AVRCP). The other loudspeakers receive audio signals sent to them encapsulated in messages that include routing data, either directly, or after said signals have been relayed via another loudspeaker.

19 Claims, 6 Drawing Sheets

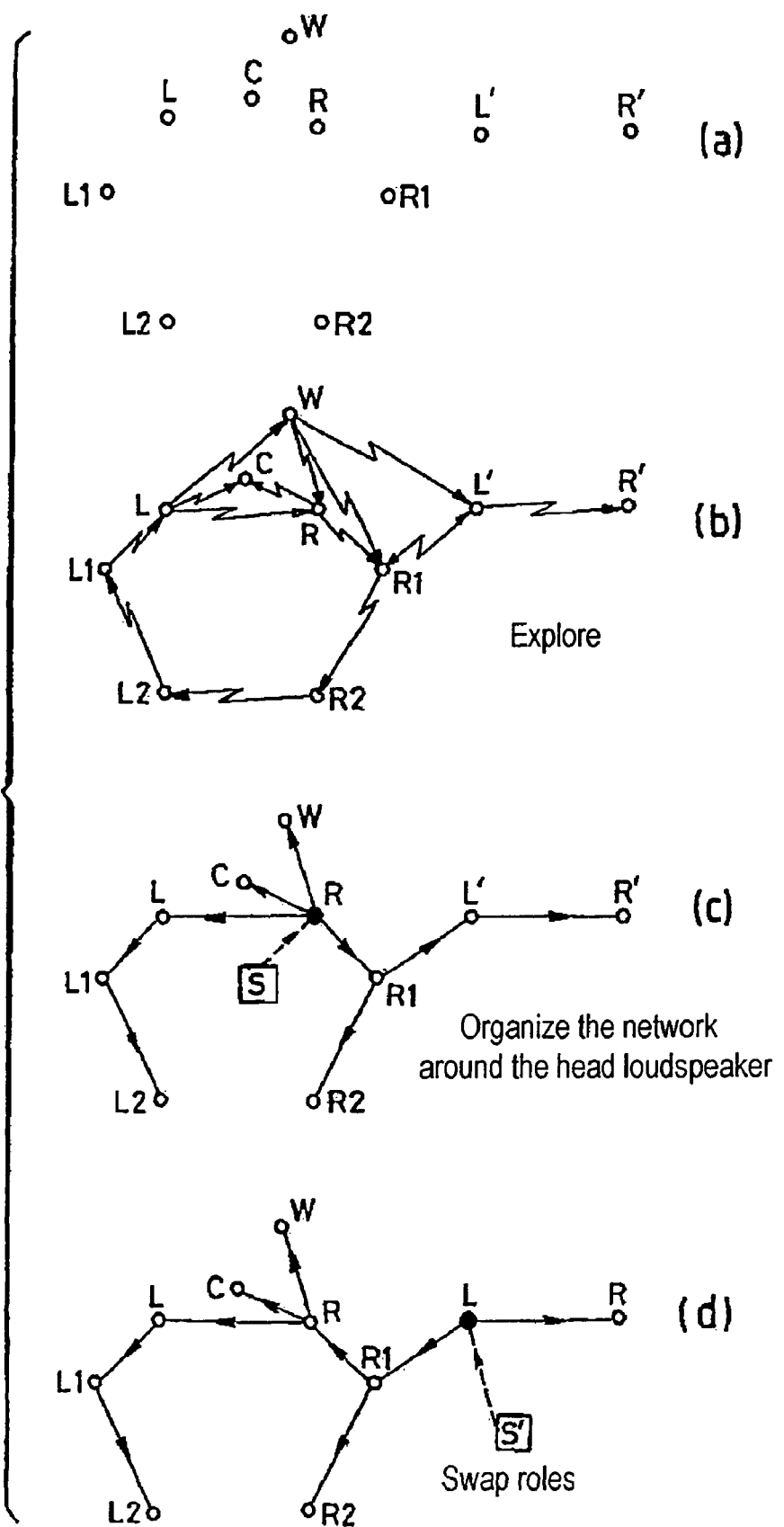
FIG_1
(a)
(b) Explore
(c) Organize the network around the head loudspeaker
(d) Swap roles

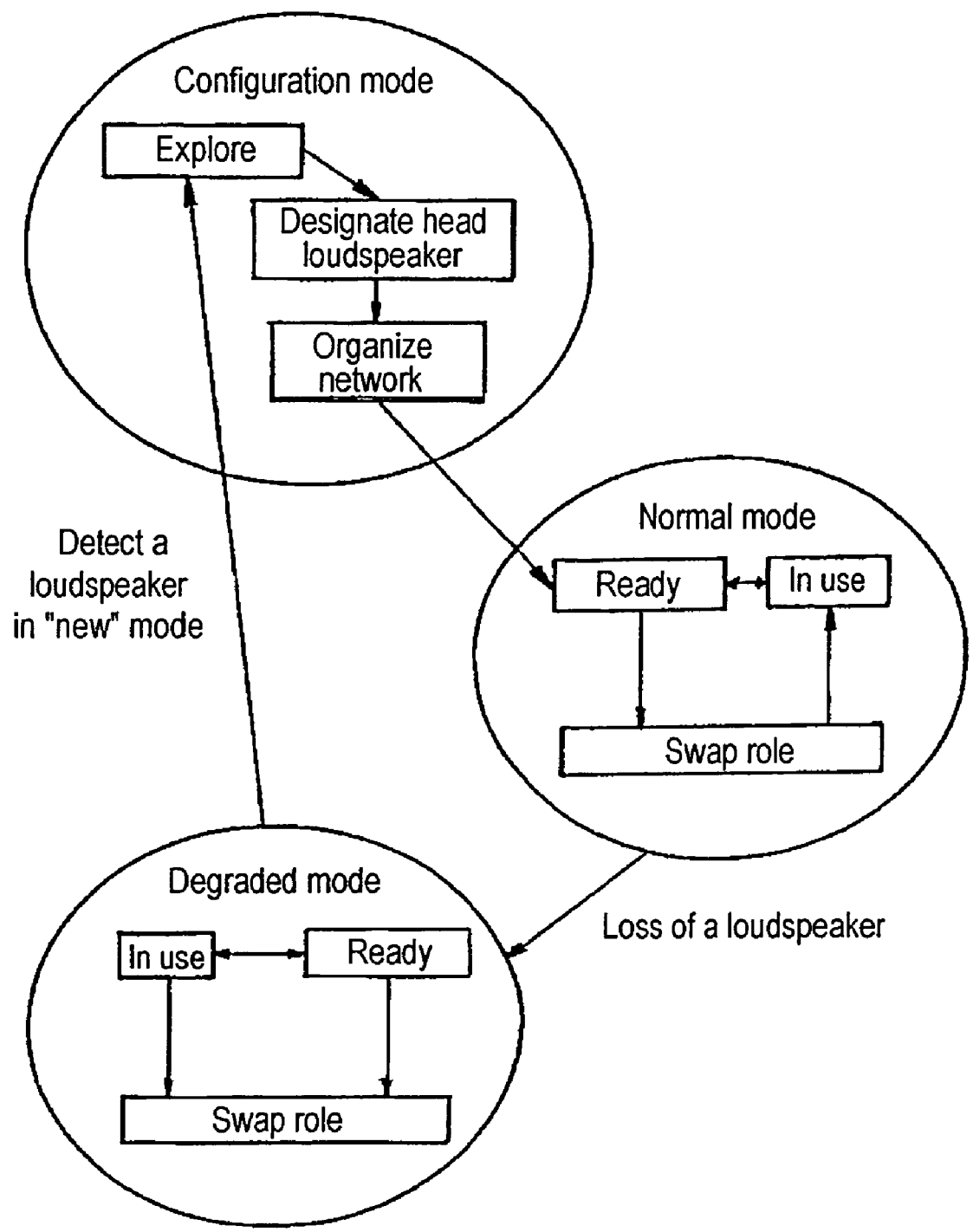
FIG_2

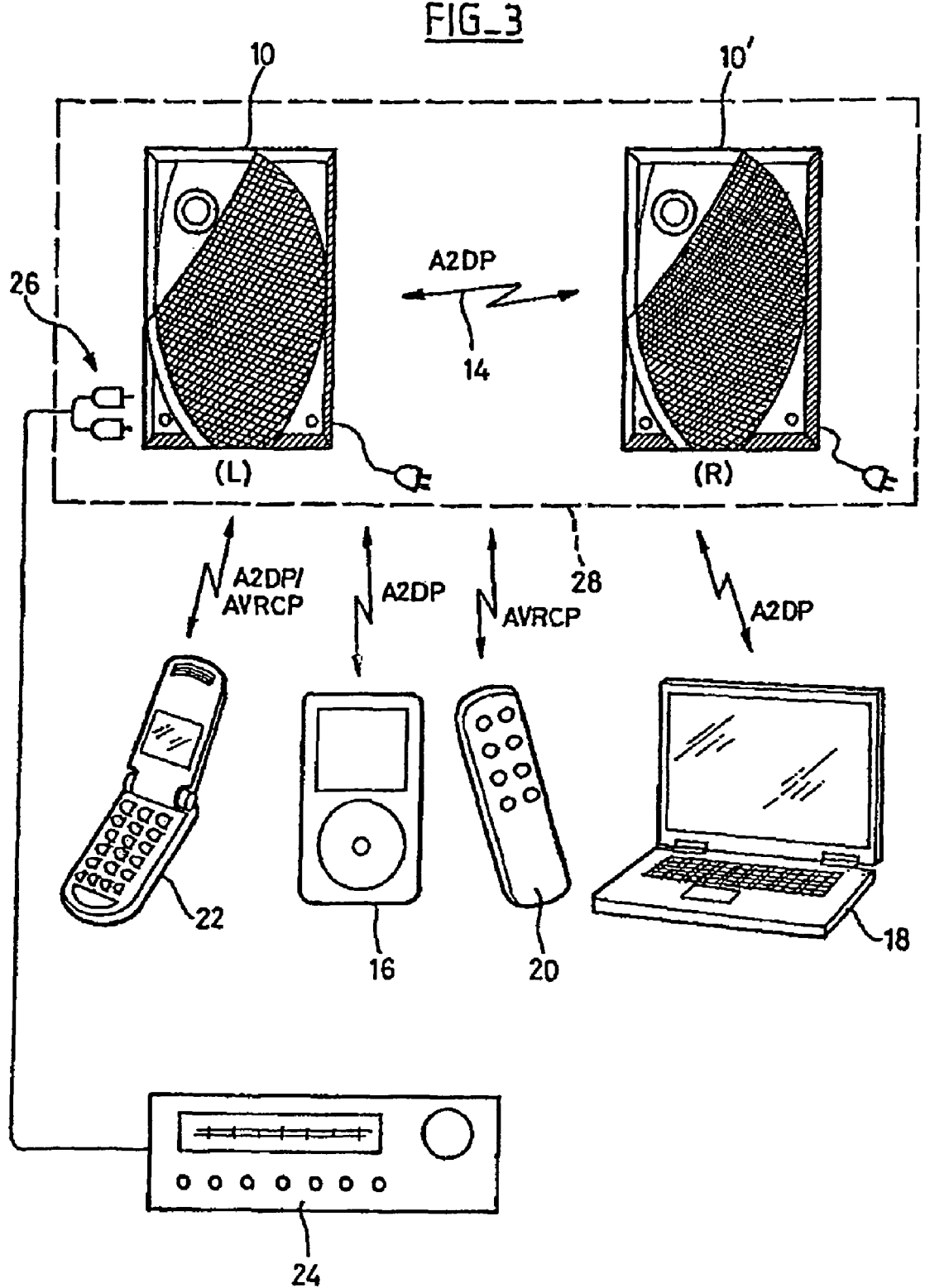

FIG_4
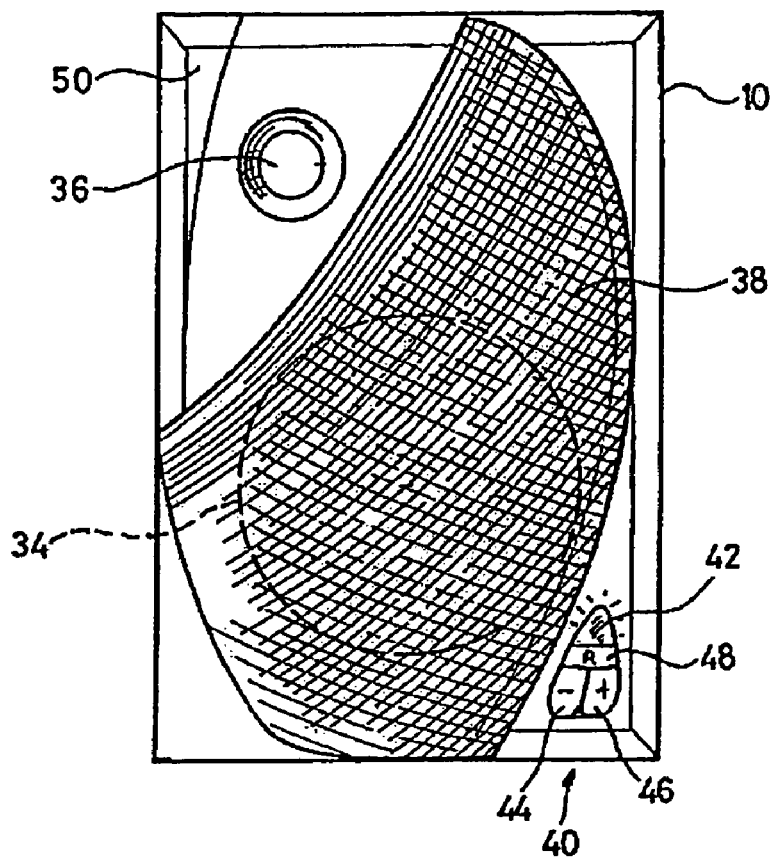
FIG_5
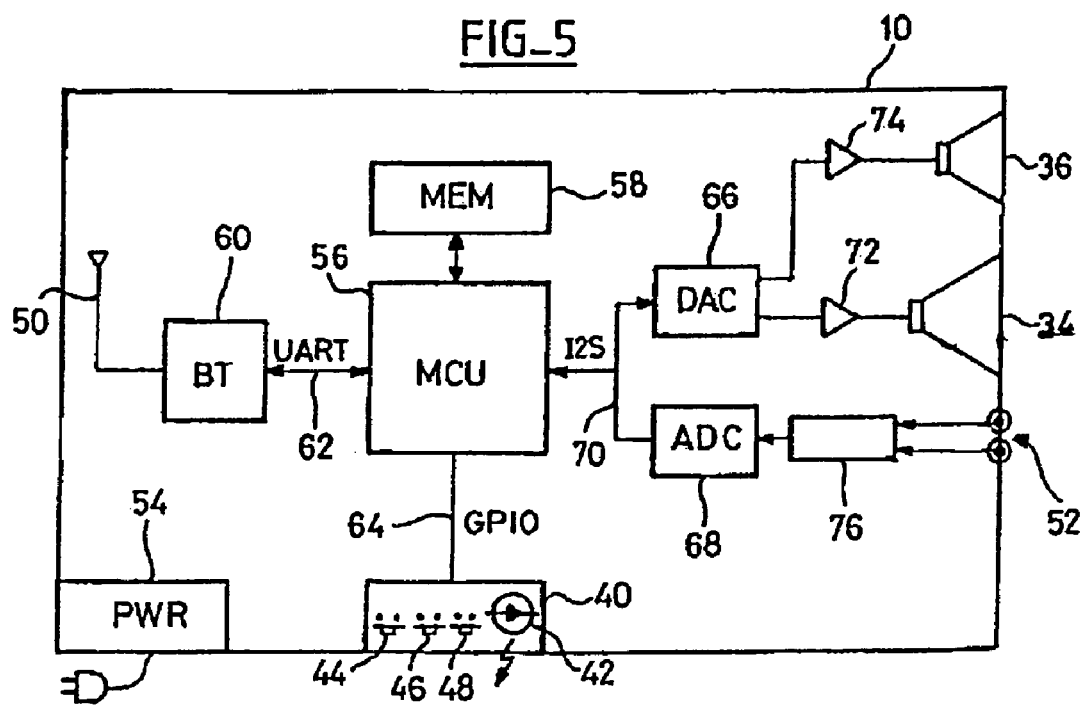

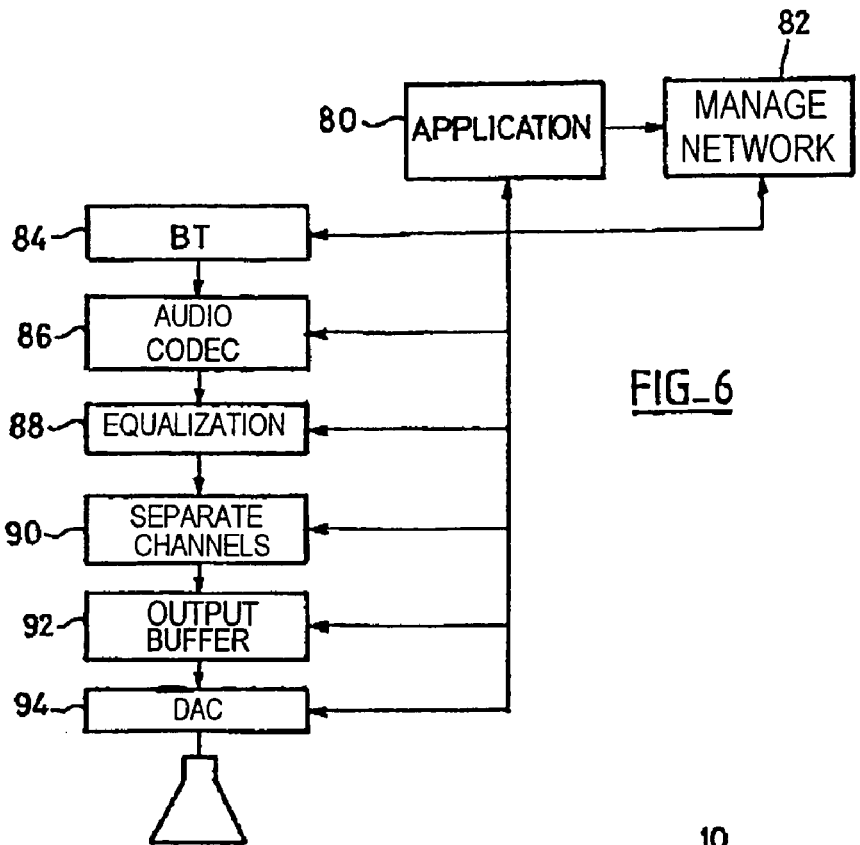
FIG_6
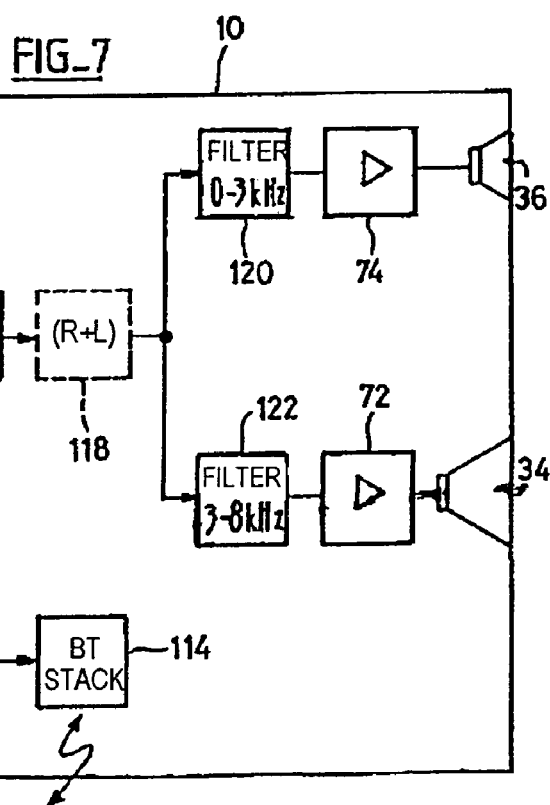
FIG_7

FIG_8
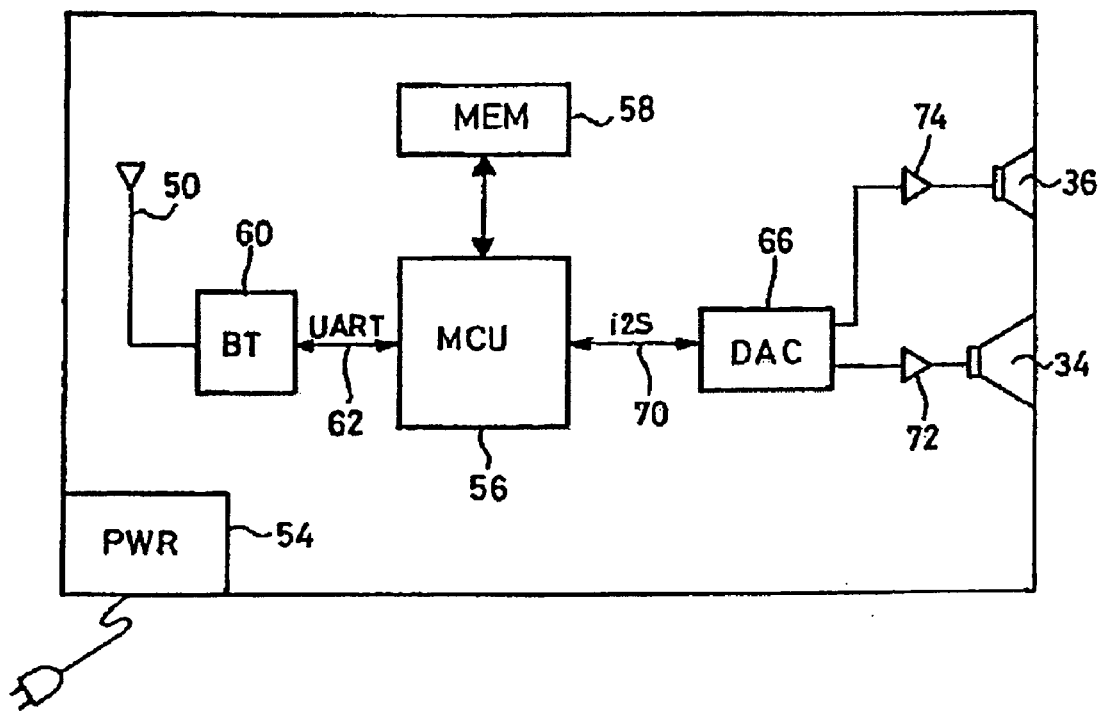
FIG_9
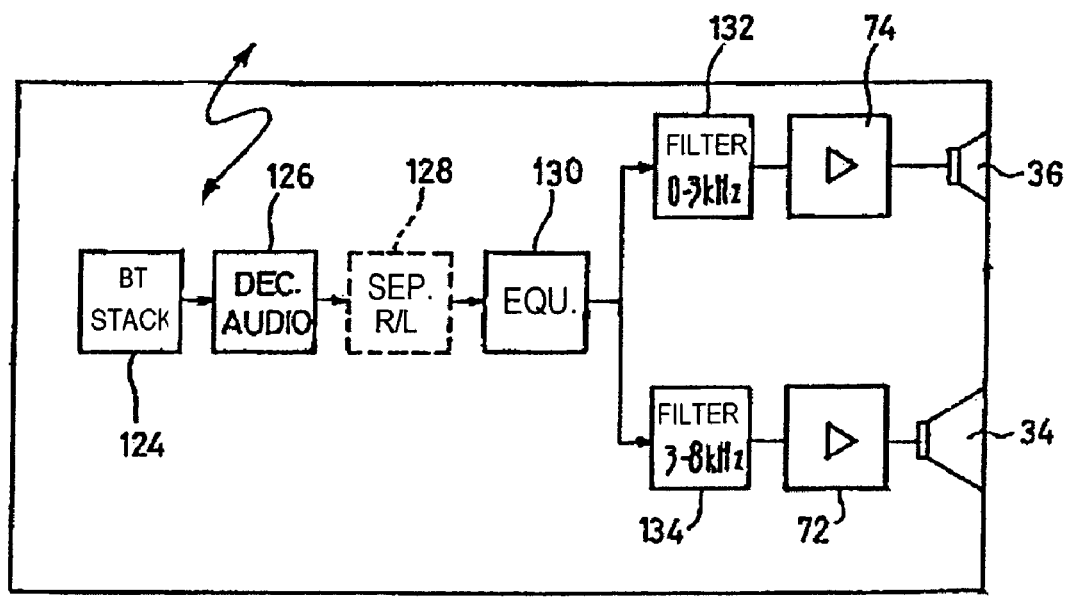

SYSTEM FOR WIRELESS AUDIO SIGNAL DISTRIBUTION BETWEEN A PLURALITY OF ACTIVE LOUDSPEAKERS

The invention relates to a system for distributing audio signals between a plurality of active loudspeakers, enabling said signals to be played back by the various respective loudspeakers.

Modern audio equipment includes an ever-increasing content of digital circuitry for processing and transmitting audio signals.

Digitization makes it possible in particular to transmit audio signals over radiowaves without loss of quality between the various elements making up an audio reproduction system. Wireless transmission is particularly advantageous when the number of channels for reproduction is large: the number of channels in use is increasing both in installations for audio reproduction only (e.g. using SACD technology for high definition audio reproduction) and in "home cinema" type installations. Generally, such installations provide a sound configuration of the "5.1" type, i.e. having a central front channel, two side front channels (left and right), two rear satellites (left and right), and a woofer. The number of channels may even be increased up to a "7.1" configuration having two additional "surround" side channels. Multiple intermediate configurations could also be envisaged, from a simple mono or stereo configuration having one or two loudspeakers to configurations including numerous satellite and surround loudspeakers.

Comparable problems arise in professional public announcement installations for use in public places, shops, hotel rooms, etc. which may have several tens or even more loudspeakers receiving music and other audio signals from a central network head. In particular, it can be desirable to broadcast signals selectively to such and such a group of loudspeakers and not to others, or to be able to move the loudspeakers easily, e.g. for temporary installations set up during shows, exhibitions, etc.

In order to avoid multiplying connection cables between the signal source and the loudspeakers, wireless transmission systems have been proposed leading to the various loudspeakers of the system, which loudspeakers are then so-called "active" loudspeakers, i.e. each comprises a loudspeaker enclosure incorporating one or more low frequency amplifiers associated with a loudspeaker proper (or a set of loudspeakers proper) of the enclosure. Active loudspeakers require low level input signals only, that can be transmitted by radio or infrared wireless means from a transmitter connected to the signal source. With such an active loudspeaker combined with wireless transmission, the only constraint is connecting the power supply of the loudspeaker to a power outlet, which gives very great freedom in positioning the various loudspeakers of the system (even when there are only two of them as in a simple stereo set), it being understood that loudspeaker positioning is very important in achieving satisfactory reproduction of a musical environment and possible sound effects.

Numerous techniques have been proposed for implementing wireless transmission of audio signals, for example an independent transmitter unit connected to an audio source, or to a "line" output of a traditional HiFi system, which unit, by analog or digital radio transmission, sends the signal produced by the source or the HiFi system to remote active loudspeakers. The transmitter unit may be incorporated in the system, the audio set then being in the form of an integrated block together with n active loudspeakers. Such a system, i.e. the set of elements in the audio reproduction system other than the loudspeakers (whether active or not), can itself be made up of a plurality of mutually remote elements interconnected by appropriate wired or wireless means, or they may be integrated in a single unit that performs the various different functions by appropriate switching (radio, CD, cassette, etc.).

It is also desirable to have wireless transmission not only in the downstream direction, i.e. from the system to the loudspeakers, but also in the upstream direction, i.e. for connection to remote sources such as a digital music player (MP3, AAC, . . . ), a personal digital assistant (PDA), or indeed a computer provided with radio transmitter means integrated therein or added thereto in the form of an adapter connected to an external port of the computer.

The various systems that have been proposed in the past solve the problem of eliminating wire connections in an audio reproduction system in part only.

Those known systems are generally designed around a transmitter unit coupled to specially adapted active loudspeakers, using proprietary technologies belonging to the manufacturer, leading to a system that is closed and capable of evolving little or not at all.

For connecting the various sources, transmitter and receiver adapters are required, with the associated connection, linking, power supply, . . . constraints that can put off users who are not enthusiastic about this type of technology.

Finally, such systems are generally not very ergonomic and require user involvement such that, in practice, the user makes use of very few of the multitude of functions that are made available by the system.

US-A-2005/0190928 describes a system for broadcasting a plurality of audio channels that is organized around a TV set. The TV communicates over wireless links with various peripherals such as active loudspeakers, a mobile telephone, a computer, etc. so as to broadcast audio channels and/or exchange control and data signals with said peripherals. The system defines a network topology from a "master" device that is predetermined either by construction (e.g. the TV is considered as being the master device), or by operating a switch that is accessible to the user. All of the other devices are then "slaves" directly linked to the master device in a star topology having one level only.

Although, by using wireless connections, the proposal of that prior art does indeed mitigate some of the drawbacks mentioned above, it nevertheless presents limited flexibility in use, in particular because the master device must be defined in advance, either by construction or by the user. As a result, the network is not necessarily configured in optimum manner, given propagation conditions in particular. Nor is the network capable of being modified dynamically as a function of circumstances: in particular if the master device is switched off or breaks down, the entire system comes to a halt.

One of the objects of the invention is to propose a universal system for distributing a multichannel audio signal that enables the above-mentioned difficulties to be mitigated, in particular by means of the following characteristics:
 a minimum number of visible hardware elements, the various functional circuits and members being incorporated in the loudspeaker enclosures and not being visible or accessible to the user;
 no connections required, other than power supply connections to the loudspeakers;
 simplified ergonomic setup, the system being "Plug-and-play", i.e. the user need be concerned only with where to place the loudspeakers and how to connect them to power outlets, with the system configuring itself in a manner that is totally automatic and transparent for the user;

the topology of the network is defined by the systems itself in a configuration that is optimized, and in a manner that is entirely systematic and automatic;

it is possible to define the network and organize its hierarchy from any of the loudspeakers of the system, the loudspeakers initially all being interchangeable from the point of view of network topology;

it is possible for the network to be reconfigured dynamically without interrupting operation, e.g. in the event of radio signal transmission conditions changing or in the event of one or more loudspeakers being disconnected;

the system is ergonomically simplified because its operation is highly automated and the number of pushbuttons and other controls is reduced to the strict minimum;

the system can evolve and is self-adapting, regardless of the number of active loudspeakers (two four, five, "5.1", "7.1", ... ): for example if a user has a configuration that is stereo (two loudspeakers), then the user need only acquire and connect two satellites and woofer in order to transform the system immediately into a "4.1" configuration without taking any action on the existing loudspeakers, the system reconfiguring itself in a manner that is entirely automatic as soon as the new loudspeakers are powered;

it is possible to use any source provided with suitable wireless transmission means; and the system can be remotely controlled, not only by a special remote control, but also by any appliance provided with keys and appropriate wireless transmission means, e.g. a mobile telephone.

For this purpose, the system of the invention comprises at least two active loudspeakers, each having: acoustic transducer means, associated amplifier means, wireless interface means, and means for applying an audio channel signal to the amplifier means for playback by the transducer means, the audio channel signal being derived from the signal received by the wireless interface means.

In a manner characteristic of the invention, the wireless interface means of each loudspeaker comprise transmitter and receiver means suitable for searching for and establishing a wireless connection with any other loudspeaker of the system. Means are also provided for automatically configuring the loudspeakers into a network, said means being suitable for: a) enabling each loudspeaker to search for the other loudspeakers with which a wireless connection can be established directly; b) for drawing up a mutual visibility table in each loudspeaker on the basis of the results of said search; and c) for using said visibility table to define a hierarchical network topology.

Most preferably, the automatic configuration means are also suitable for: d) designating at least one, and preferably only one, of the loudspeakers as a network head, said head loudspeaker being made suitable for searching for and establishing a wireless connection with a remote peripheral capable of transmitting a coded multichannel audio signal and/or a control signal, the other loudspeakers being designated as dependent loudspeakers.

According to various advantageous aspects of the invention:

the automatic configuration means are also suitable for: e) making the dependent loudspeakers unsuitable for searching for and establishing a wireless connection with a remote peripheral suitable for transmitting a coded multichannel audio signal and/or a control signal;

the automatic configuration means are also suitable: f) for defining for the network, on the basis of the hierarchical network topology, a directed graph for broadcasting the audio signals to be reproduced by the system of loudspeakers, said broadcasting being organized from the head loudspeaker towards the other loudspeakers of the network either directly from said head loudspeaker, or indirectly with signals being relayed via one or more other loudspeakers of the network;

the system can occupy two functional states as alternatives, namely an in-use state in the presence of audio signals being broadcast within the network, and a ready state in the absence of audio signals being broadcast within the network, the automatic configuration means being inhibited when the system is in the in-use state;

the automatic configuration means are also suitable: g) for receiving from a dependent loudspeaker a role swapping order and for transmitting said order to the head loudspeaker, and h) for temporarily allocating dependent loudspeaker status to the head loudspeaker, temporarily allocating head loudspeaker status to the dependent loudspeaker that issued the role swapping order, and adapting the directed broadcast graph accordingly; and the audio signals broadcast over the network are audio signals encapsulated in digital data messages also including message routing data, determined from said broadcast graph defined by the configuration means. In particular, assuming the loudspeakers are individualized by respective addresses, the routing data may comprise: the address of the loudspeaker sending the message, the address of the loudspeaker constituting the destination to the message, and a flag specifying whether the destination loudspeaker is to reproduce the audio signals or is to relay them to one or more other loudspeakers of the network.

The audio signals broadcast over the network may be multichannel audio signals, in which case the loudspeakers are suitable for extracting the audio channel signal they are to play back from the multichannel audio signal they receive, and for applying said audio channel signal to the amplifier means, and possibly also for relaying the other audio channel signals to at least one other loudspeaker of the system.

The automatic configuration means are means that are activated on demand, e.g. by pressing on a button of a loudspeaker, and/or on each occasion the power supply circuits of a loudspeaker are switched off.

Preferably, in the event of configuration failing, the automatic configuration means activate the system in a degraded mode in which a plurality of different audio channel signals are initially combined with one another and then broadcast to a reduced number of network loudspeakers to be played back by the transducer means thereof.

The system may advantageously provide means for evaluating the relative transfer times of the audio channel signals to the various respective loudspeakers of the system, and time-shift means for applying respective delays to at least some of the audio channel signals suitable for compensating the differences between the relative transfer delays as evaluated.

At least one of the loudspeakers of the network may include wire connection means for connection to a source of audio signals, and analog-to-digital converter means for converting them into a corresponding digital audio signal.

System control means may receive a control signal from a peripheral and respond thereto by performing corresponding actions of modifying operating parameters of the system, including: selecting one audio signal source from a plurality of sources that are simultaneously active; varying the overall volume or the relative volume of the signals played back by the transducer means of the various loudspeakers of the system; and/or momentarily muting sound.

According to other advantageous subsidiary characteristics:

the means suitable for designating one of the loudspeakers as the network head loudspeaker operates as a function of predetermined criteria comprising one or more of the following criteria: MAC address number; possibility of setting up a direct link between the head loudspeaker and each of the other loudspeakers of the network; searching for the simplest network topology; the acoustic role of the loudspeaker in the network;

the means suitable for designating one of the loudspeakers as the network head loudspeaker are means suitable for dynamically redesignating the head loudspeaker in the event of a change in said mutual visibilities of the loudspeakers and/or of said predetermined criteria; and the means in each loudspeaker suitable for searching for the other loudspeakers with which a wireless link can be established directly comprise means for mutual authentication between the loudspeakers, in particular means of the public key algorithm type in which the public key and the private key are predetermined and common to all of the loudspeakers of the system.

There follows a description of an embodiment of the apparatus of the invention, with reference to the accompanying drawings in which the same numerical references are used from one figure to another to designate elements that are identical or functionally similar.

FIG. 1 shows the various steps (a) to (d) in setting up and configuring a network of loudspeakers of the invention.

FIG. 2 is a diagram showing various modes of operation of the system of the invention, with the available state transitions and modes.

FIG. 3 is a diagrammatic view of an example of a system of the invention and the various elements that may be connected thereto.

FIG. 4 is a front view of one of the active loudspeakers of the system of the invention.

FIG. 5 is a functional block diagram of the active loudspeaker of the system of the invention.

FIG. 6 shows various logic modules involved in playing back the audio signal.

FIG. 7 is a functional block diagram showing various elements of the loudspeaker that are involved in audio playback.

FIGS. 8 and 9 correspond to FIGS. 5 and 7, for a simplified loudspeaker usable in the system of the invention.

The various steps in configuring a network are described initially with reference to FIG. 1.

By way of example, reference is made to a system comprising a "7.1" type configuration plus an additional pair of stereo loudspeakers, e.g. loudspeakers installed in another room.

Nevertheless, the teaching of the invention is applicable, by mere extrapolation, to configurations having a smaller number of loudspeakers (e.g. a basic stereo configuration with left and right loudspeakers only, which is the simplest configuration), and also to configurations that are even more complex, e.g. in professional public address applications.

Initially, the user places the loudspeakers in the desired positions, ensuring that the various sound sources are properly positioned relative to one another. A "7.1" configuration thus comprises loudspeakers for the central front channel C, the left and right side front channels L and R, the side surround channels L1 and R1, the rear satellites L2 and R2, and a woofer W. In the example shown, it is assumed that the installation also includes a right and left pair of loudspeakers L' and R' e.g. in an adjacent room.

Each of the loudspeakers is an "active" loudspeaker enclosure, i.e. it comprises not only one or more loudspeakers proper, but also an integrated amplifier. Each loudspeaker also has a radio interface enabling it to communicate with the outside so as to receive and send signals in the manner described in greater detail below with reference to FIGS. 5 to 7.

The type of both-way radio wireless connection selected is most advantageously a Bluetooth type connection (registered trademark of Bluetooth SIG, Inc.).

The Bluetooth specifications provide the option of remotely controlling a remote device over a both-way wireless connection. In practice, the device is usually a portable telephone handset or a computer peripheral, however the Bluetooth specifications are not limited to that type of appliance, and in particular they include profiles that are compatible with transmitting encoded multichannel audio streams of high quality (profile A2DP: Advanced Audio Distribution Profile), and profiles providing interoperability for Bluetooth appliances with audio and video control functions (profile AVRCP: Audio Video Remote Control Profile).

Using Bluetooth technology is particularly advantageous given its universal and evolving nature, the existence of numerous functions, and also of numerous components specially designed for implementing it, which also have the advantage of being inexpensive. However this selection is not limiting in any way, and the invention could be implemented using other wireless transmission techniques providing those techniques provide a data rate that is sufficient for transmitting high quality digital audio signals: this applies for example to the so-called "WiFi" IEEE 802.11 standard (ISO/IEC 8802-11).

It should be observed that Bluetooth technology is used in the context of the invention in a manner that is somewhat different from its original purpose—but nevertheless without modifying protocols, so as to remain fully compatible with the requirements of the Bluetooth specifications. Bluetooth technology was designed to enable data to be transmitted occasionally and over a short duration, e.g. the duration of a telephone conversation, or the time required to send a file to a printer, and in the past it has not been envisaged to use it for establishing a permanent connection in a system as applies in the invention, where, as explained below, the connection with the various loudspeakers lasts so long as the speakers are powered: when the system is on standby, i.e. apparently inactive for a user, the wireless connections between the loudspeakers remain active, although carrying reduced information traffic, so as to enable the configuration of the network to be maintained and so as to enable the network to be ready at any moment to detect an external signal.

Another original feature of the invention consists in taking advantage of the particular possibilities made available by the Bluetooth specifications for establishing not only point-to-point connections between two elements, but also for establishing and managing networks of greater or lesser complexity set up between a certain number of elements.

A first type of network is the "piconet" of the kind that becomes established automatically when a plurality of Bluetooth-compatible elements are within range of one another. The piconet uses a star topology, having a master and a plurality of slaves. The slaves may either be "in use", i.e. in communication with the master, or "parked", i.e. temporarily put to sleep, but with the possibility of being woken up by the master in order to make use of them. Communication is direct between the master and the slaves. The slaves cannot communicate amongst one another.

Another type of network in the Bluetooth specifications is the "scatternet", which is a network made up of a plurality of piconets possessing a plurality of masters, the piconets being interconnected via slaves they have in common. This makes it possible to extend the geographical extent of the network by partial overlap and chaining of a plurality of piconets.

In this respect, it should be observed that the invention is described below in the context of transmission implementing Bluetooth technology, but as mentioned above, this selection is not limiting in any way, and other technologies suitable for setting up a wireless local network (WLAN) are equally usable. In particular, the "master/slave" terminology that is to be found in the Bluetooth specifications should not be considered as being limiting in any way, and must be considered as being equivalent to any other terminology for describing network topology, such as "host/peripheral", "host/device", or "client/server".

Starting from a set of independent loudspeakers merely put into place in premises, as shown in FIG. 1a, the invention proposes creating and configuring a wireless network interconnecting the loudspeakers, the network serving to distribute audio signals for playing back by the loudspeakers of the system, the signals being in the form of digital messages.

It is explained below how the configuration can be set up in entirely automatic manner that is also adaptive, i.e. the organization of the network can be modified automatically, e.g. in the event of a loudspeaker being added or removed, with this happening in a manner that is entirely transparent for the user.

Initially, and this is a particularly original characteristic provided by the invention, all of the loudspeakers are independent and on an equal footing in terms of the topology of the network that is to be configured, i.e. the loudspeaker that is to be the master (host) of the hierarchical network is not necessarily determined a priori, and as a function of circumstances it could be any of the loudspeakers of the system.

The loudspeakers are nevertheless "differentiated", not in terms of connection topology (which becomes defined by the network once it is configured) but in terms of physical position, which is a function of the audio roles they are to play: e.g. "right loudspeaker", "left loudspeaker", "woofer", "right rear satellite", "left rear satellite", etc.

A loudspeaker can be differentiated in several manners:
in permanent hardware manner: the loudspeaker then carries a label specifying the role it is to play in the installation;
in modifiable hardware manner, e.g. by means of an internal switch or a switch on its rear face;
by software, a posteriori, after the network has been configured, by sending specific messages thereto at the request of the user; or
in entirely automatic manner, providing a priori or a posteriori means for locating the relative positions in three dimensions of the various loudspeakers, so as to differentiate them as a function of their relative physical positions.

Prior to configuration, all of the loudspeakers are in a "new" mode, i.e. they are still independent, and will seek to configure themselves in a network.

The first stage of the protocol for configuring the network is illustrated in FIG. 1b.

This stage is performed independently by each of the loudspeakers, and in application of standard Bluetooth protocols: each loudspeaker configures itself in a "discoverable" mode so as to be capable of being recognized by the others, and it searches for all of the loudspeakers situated within range, i.e. with which it can establish satisfactory wireless communication. Because of the spacing between the elements and the voluntarily limited range of Bluetooth transmission, it can happen that some of the loudspeakers are not visible to all of the other loudspeakers, or that the connection is of quality that is inadequate, which would have the effect of introducing an excessive number of transmission errors leading to repetition of data for transmission and to excessive delay in the received audio stream.

At this stage or at a later stage, the loudspeaker also examines whether the Bluetooth object with which it has established a working connection is indeed a "compatible" object, i.e. a loudspeaker for setting up a system of the invention, and not a peripheral for subsequent use (audio source or remote control), or indeed some other Bluetooth device having no functional relationship with the system of the invention (printer, etc.). This verification of compatibility may be based in particular on specially setting a free Bluetooth parameter, e.g. the "Dedicated Inquiry Access Code".

In particular, this verification may implement mutual authentication between the loudspeakers, e.g. authentication based on a public key algorithm of the RSA type, or the like.

That algorithm is itself well known, however it is used herein in original manner.

In the context of the present invention, two loudspeakers must be capable of performing authentication:
mutually;
safely (made possible by a public key);
quickly;
without intervention or involvement of the user (unlike an RSA algorithm used in conventional manner); and
as a preliminary (insofar as it is not possible to establish an effective connection with the remote loudspeaker prior to authentication).

The invention uses the characteristic whereby the software of the loudspeakers is the same for all the loudspeakers, and the identity of that software as determined by the public and private keys is the same for all of the loudspeakers, and thus known to each of them.

To this end, each loudspeaker uses predetermined identity data, e.g. the "Friendly Name" or "EIR Information" of the Bluetooth specifications or the SSID identifier of a WLAN network, and uses a public key algorithm of the RSA type to combine this data with authentication data to produce a digital signature. This signature is received by the remote loudspeaker, which decodes it and compares it with its own identity data.

It should be observed that insofar as the public and private keys are the same in each loudspeaker (all using the same software) and thus known in each loudspeaker, there is no need to proceed with a prior exchange of the public key prior to authentication.

It should also be observed that the above-mentioned "Dedicated Inquiry Access Code" check constitutes a first level of filtering that serves to limit the impact of the interrogations performed on the other loudspeakers.

Furthermore, insofar as each loudspeaker broadcasts a message to all of the other loudspeakers, the procedure is also executed in the opposite direction from the remote loudspeaker. Authentication of the invention is thus mutual and symmetrical authentication between two loudspeakers. When the number of loudspeakers is greater than two, authentication is performed in the same manner between all pairs of loudspeakers present.

On the basis of the results of the search performed in this way, each loudspeaker draws up a "proximity table" in which each of the loudspeakers that is visible thereto is identified in unambiguous manner, e.g. by means of its MAC (Media Access Control) address, which in the present example is the Bluetooth address. By way of example, for each of the loudspeakers found, the table comprises its MAC address, the version of its software, and its "differentiation" in the meaning specified above, i.e. the definition of its specific role (left front, right front, woofer, etc.).

The second stage of the configuration protocol consists in designating one of all of the loudspeakers that have been found in the preceding stage as the network head loudspeaker, from which the network will be organized in hierarchical manner so as to define unambiguously a path for broadcasting audio signals.

This loudspeaker, refereed to below as the "head loudspeaker" also serves as a "pier", i.e. a bridge to the outside for the network, i.e. it constitutes the only visible point of access for any peripheral forming a source of audio signals and/or control signals for the network. Examples of such peripherals are described in greater detail below with reference to FIG. 3.

An important aspect of the invention lies in the fact that the system constituted by the various loudspeakers of the network behave as a single unit with respect to various external wireless peripherals with which it may be coupled, i.e. once the system has been configured, the various peripherals will see, functionally, only one Bluetooth-compatible device with which each peripheral may be coupled without it being necessary for that peripheral specifically to adapt itself to the topology of the various loudspeakers of the system, and this applies even when communication with the head loudspeaker is not direct but takes place via one or more other loudspeakers (this aspect of the invention is described in greater detail below).

The designation of a loudspeaker as the head loudspeaker is performed by an algorithm which attributes a score as a function of various parameters, e.g. the most recent software version number, the highest MAC address, etc. This algorithm is performed by each of the loudspeakers on the basis of its proximity table, applying the algorithm to each of the loudspeakers listed in the table: it then makes a connection to that loudspeaker in order to exchange messages serving to evaluate the criterion of the interrogated loudspeaker compared with its own criterion. The messages exchanged are of the question/answer type, such as: "is your score better?", "my score is better", "my score is no better", I am the head loudspeaker": each loudspeaker searches for the "candidate" network head by applying the algorithm to all of the inputs in its proximity table, and then connects to that candidate, and in order to confirm its decision sends it a message "is your score better?" (understood: ". . . than the score given by the algorithm applied to my proximity table"). The reply will be: "my score is better", "my score is no better", or "I am the head loudspeaker". Then the loudspeaker which believes it has the best score attempts to connect itself to all of the other loudspeakers, and so on, step by step, until the loudspeaker is found that does indeed have the highest score, and that is the loudspeaker that becomes designated head loudspeaker.

In general, the criterion for selecting the head loudspeaker from all of the loudspeakers can be a single criterion or a combination of several criteria that are associated and possibly weighted, including:

the MAC address number ("Device Address" in the particular circumstance of communication using Bluetooth technology);

the possibility of establishing a direct connection between the head loudspeaker and each of the other loudspeakers in the network (no hidden node);

seeking to establishes the simplest possible topology (e.g. avoiding scatternets if a piconet topology is possible and sufficient); and the acoustic role of the loudspeaker in the network (e.g. a central loudspeaker or a woofer will be considered a priori to be positioned more favorably than a rear satellite).

As explained below, it is possible, if necessary, to proceed with dynamic reconfiguration of the network, in a manner that is transparent to the user, should one of these criteria change.

The exchange of messages between the various loudspeakers during this second stage makes it possible, progressively, to correct for any error in selecting the head loudspeaker due to the network being known in portions only (one loudspeaker might not necessarily be able to see all the others), or to omissions that might occur during detection.

After a certain number of iterations, this second stage thus terminates in designating the head loudspeaker (pier) with all of the other loudspeakers then being designated as "dependent loudspeakers", i.e. loudspeakers that are not independent, but that are dependent on the head loudspeaker and that receive audio data for playback therefrom.

The third stage of the configuration protocol is a stage of organizing the network about the head loudspeaker (pier networking), shown in FIG. 1c.

This involves changing from the configuration of FIG. 1b where all of the loudspeakers are performing the same role in the network, and where a plurality of paths exist to go from one loudspeaker to another, to the configuration shown in FIG. 1c which is a hierarchical network topology in the form of a directed graph defining a single path between the head loudspeaker (loudspeaker R in the example shown) and any other loudspeaker of the system.

To achieve this, the head loudspeaker begins by collecting the proximity tables from all of the other loudspeakers. Each dependent loudspeaker sends its proximity table to the "candidate" found in the preceding step. It forwards it to its own "candidate", and so on until the head loudspeaker is reached.

The head loudspeaker then explores all of the collected proximity tables and constructs a network graph as a function of the visibilities of each of the loudspeakers. A certain number of messages are thus exchanged between the loudspeakers coming from or going to the head loudspeaker. This enables it to draw a map of the network in its initial form on the basis of the visibility tables of all of the other loudspeakers, even if there exists a loudspeaker that cannot see all of the others. The network may be of very large extent, e.g. in professional applications for public address in public premises.

In the network, each loudspeaker may be:

a source loudspeaker, corresponding to the network head (loudspeaker R in the example of FIG. 1c); the source loudspeaker receives data coming from the audio source (S in FIG. 1c) and broadcasts it to one or more other loudspeakers in the network;

a relay loudspeaker that is to relay messages to one or more destinations defined by the routing scheme (applies to the loudspeakers L, L1, R1, and L' in the example of FIG. 1c); a relay loudspeaker is an internal node of the network that receives audio data from another node (the source loudspeaker or another relay loudspeaker) and that forwards it to one or more other loudspeakers; and a terminal loudspeaker that receives messages but that does not relay them (as applies to the loudspeakers L2, C, W, R2, and R' in the example of FIG. 1c).

Depending on the capacity of the network and on mutual visibilities, several topologies for optimizing the broadcasting of messages can be envisaged starting from the network head.

More precisely, the broadcast graph is made up of a combination of piconets and scatternets, in the meaning of the Bluetooth specifications.

For this purpose, the algorithm draws up a graph in which each node corresponds to a loudspeaker and in which two nodes are connected if and only if at least one of the two loudspeakers can see the other. This graph is used to calculate an optimized configuration for the network, for subsequent use in transmission over an optimum path (thus with the highest possible data rate) of the audio signals that are to be reproduced as a continuous stream, and for deciding which loudspeakers of the system that do or do not need to be kept visible.

Once the graph has been constructed, the algorithm determines hinge points, i.e. points of the graph which, if eliminated, would lead to the graph being partitioned into a plurality of distinct subgraphs.

The configuration of the network is then revised so as to take the form of a scatternet, i.e. a chain of piconets (these terms being understood in the meaning of the Bluetooth specifications). Such a chain of piconets enables the audio stream to be broadcast from the head loudspeaker to each of the other loudspeakers. For this purpose, the algorithm uses the visibility graph and recalculates an optimized network based on knowledge of the hinge points. The result, or "routing scheme" defining for each loudspeaker its role in transmitting signals within the network, is presented in the form of scatternet tables made up by the head loudspeaker and sent in the form of encapsulated messages to each of the loudspeakers that form nodes of the graph.

Once this third stage of the initialization process is complete, the network has been set up and is operational for receiving and broadcasting audio signals.

This is shown in FIG. 2 by the passage from "configuration" mode to a so-called "normal" mode.

In this "normal" mode, the system can take two states, namely "ready" and "in use".

When it has just been configured, the system is in the "ready" state.

The transition from the "ready" state to the "in-use" in state can be the result:
either of detecting the transmission of audio signals from a peripheral to the network head;
or else by a "role swap" request sent to the head loudspeaker by another loudspeaker of the network (this possibility is described below).

In the in-use state, audio data coming from an external peripheral is conveyed over the network via a loudspeaker referred to as a "host" (i.e. the server in a client/server relationship), which by default is the head loudspeaker, as in the configuration of FIG. 1c. However, as explained below with reference in particular to FIG. 1d, this role may be modified temporarily.

Still in this in-use state, the system appears overall to the outside as a single Bluetooth object, that can be discovered by some other Bluetooth object that possesses a compatible profile, i.e. specifically a peripheral S that constitutes an audio source (A2DP profile) and/or a remote control (AVRCP profile).

The audio streams and the commands are received and processed by the head loudspeaker, i.e. it then broadcasts them to all of the other loudspeakers of the system either directly or indirectly (the streams then being relayed by loudspeakers situated at the hinge points of the network).

The messages exchanged within the network are advantageously messages in which the audio signals are encapsulated in digital data messages that also include routing data determined from the broadcast graph, and in particular:
the address of the message sender;
the message of the message destination; and
a flag specifying whether the destination should or should not relay the message: if it is to be relayed, the message is merely forwarded to its destination; otherwise, it is processed by the loudspeaker so as to be played back thereby, with it also being possible for it to be relayed, if necessary, to another loudspeaker.

In order to optimize the data rate, it is possible as a function of the "differentiation" of the loudspeakers, i.e. the audio role given to each of them as a function of its physical position, to send to any particular speaker only data that is useful for that speaker. For example, if a loudspeaker in the meaning of the routing scheme is a destination speaker of the "right rear" type, then the loudspeaker situated upstream therefrom in the network and that relays data thereto will relay only data that is for the right rear channel.

Furthermore, given the transit times of the data blocks of the audio stream, and also the time offsets that are introduced by using stacks and by the various digital processing applied, the audio streams played back by the various respective loudspeakers in the network might be slightly offset relative to one another. In order to compensate for this time offset and ensure that the channels are reproduced perfectly in phase, the audio stream processing advantageously includes provision for applying a delay to compensate for the delays of the channels that would otherwise be in advance relative to the others. These compensating delays are evaluated by the head loudspeaker and applied to the appropriate audio stream.

When the network is in the "in-use" state, the network head receives audio data from an external source and is not accessible for some other type of dialog. Modifying the operating parameters of the network (e.g. adjusting sound volume), or reconfiguring the network (e.g. adding or removing a loudspeaker) can be performed only when the network head is in the "ready" state.

To make this possible, it is necessary to wait for the end of receiving data from the peripheral, which can be detected automatically by the network head.

Advantageously, the system includes a function known as "role swapping", as shown in FIG. 1d.

It is mentioned above that, by default, it is the network head that is the loudspeaker that receives, from the external peripheral, the signals for broadcasting to the other loudspeakers, which are then so-called "dependent" loudspeakers.

However, it must be possible to use another source which, given its position, cannot establish direct radio contact with the network head, for example a source S' that is too far away from the loudspeaker R to be able to transmit audio data thereto. This may also apply to data coming from a loudspeaker other than the head loudspeaker and that is provided with an input connector that can be connected by cable to an audio signal source, generally in analog form (this point is explained in greater detail with reference to FIGS. 3 to 7). The source S' is nevertheless within radio range of one of the loudspeakers linked to the system, for example the loudspeaker L' in the example of FIG. 1d.

In order to be able to broadcast music while in this configuration, the dependent loudspeaker L' sends to the network head R a "role swap request". This request is received and processed by the head loudspeaker which then temporarily defines a new routing scheme so as to be able to broadcast audio signals from the loudspeaker L' instead of from the loudspeaker R. It should be observed that this modification to the routing scheme takes place without changing the basic definition of the broadcast graph; only the direction of various branches might be changed, corresponding to changing originating and destination addresses in the routing scheme.

Thus, without it being necessary to reconfigure the network, the loudspeaker L' becomes the "host" (i.e. server, in the meaning of a client/server relationship), becoming temporarily the network head, the loudspeaker R receiving data (i.e. being a client in the meaning of a client/server relationship) coming temporarily from a dependent loudspeaker.

Role swap requests may be processed in combination with priority rules between sources, for example sound coming from a wireless telephone has priority over sound coming from a TV, etc.

This role swapping is temporary, with a return to the initial state being triggered by an algorithm that detects the absence of audio signals being delivered by the source S'. The network then returns to the "ready" state in its original configuration.

According to another aspect of the invention, in addition to "normal" mode, there is provided a "degraded" mode that is taken up automatically by the system in the event of a link between two loudspeakers being lost, i.e. when one of the neighbors in the routing scheme can no longer be recognized.

Changeover to degraded mode can occur at any moment insofar as the radio linking between loudspeakers is permanent, as mentioned above, even when no audio signal is being reproduced and the system appears to the user to be on standby (in fact it is then in the "ready" state, the state in which the various loudspeakers continue to exchange signals between one another). In "degraded" mode, the system remains functional, but with reduced performance, e.g. it operates in mono if the system was a stereo system, or the surround channels are eliminated, etc. Degraded mode has the same "in-use" and "ready" states and role swapping as in normal mode, with similar transitions.

Furthermore, as mentioned above, the system continues with a background task of detecting the loss of a loudspeaker or indeed the appearance of a loudspeaker that is not linked to the network (a loudspeaker that is in "new" mode). Under such circumstances, all of the loudspeakers then switch to that "new" mode and the system carries out a new configuration procedure.

If necessary, it is also possible to reconfigure the network dynamically in a manner that is transparent for the user. This reconfiguration consists in reallocating the head loudspeaker, in particular if one of the criteria that led to the initial allocation becomes modified: a loudspeaker may be moved or switched off, a faulty loudspeaker may be replaced by another loudspeaker, transmission may be disturbed because of a change in the environment, . . . . The system is then capable of reconfiguring the network dynamically, and the head loudspeaker may possibly, but not necessarily, be the same loudspeaker as before.

Advantageously, in order to avoid reconfiguring the system when that is not necessary (for example if a link is unstable because a person is moving in front of the loudspeaker and temporarily interrupting the link), an algorithm is provided that limits the number of restarts and/or that undertakes reconfiguration only after a predetermined delay. Similarly, if one of the loudspeakers has a tendency to breaking down, the algorithm can provide for keeping it permanently out of the network the next time the routing scheme is defined.

There follows a description of a concrete and simplified embodiment of a system of the invention with reference to FIGS. 3 to 9.

The system comprises two loudspeakers 10 and 10' interconnected by a wireless link 14. The system is suitable for being coupled to various peripherals, e.g. a digital music player 16 provided with an (internal or external) Bluetooth module transmitting an audio stream to the system using an A2DP profile, or a laptop computer 18 sending audio data to the system in the same manner. The peripherals may also include control peripherals, e.g. a remote control 20 sending control signals to the system using an AVRCP profile. The peripheral may also be a peripheral capable of sending both audio signals and control signals, e.g. a Bluetooth-enabled combined mobile telephone and digital music player having various keys suitable for being used to control the system of the invention (select sources, volume, balance, . . . ).

The system may also be connected to traditional elements such as FM tuner, a CD or DVD player/recorder, a TV, etc., over wire connections using plugs 26 connected to corresponding input sockets provided on the loudspeaker 10.

FIG. 4 shows the general outside appearance of a two-channel loudspeaker enclosure having a base/medium range loudspeaker 34 and a tweeter 26, possibly hidden behind a decorative grille 38. The loudspeaker is also provided with a control block 40 having an indicator light 42 serving to indicate operation by changing color and/or flashing rate, together with three control keys including two keys marked "+" and "−" 44 and 46 for increasing or decreasing general volume, and possibly a "reset" key 48 for reinitializing the system. The loudspeaker also has an antenna 50 for wireless transmission which may be left visible in a transparent region of the loudspeaker enclosure.

FIG. 5 is a block diagram showing the various hardware members of the loudspeaker 10.

In addition to the various elements mentioned above with reference to FIG. 3, the loudspeaker also has input sockets 52 disposed on the side or the back of the enclosure, for connecting an element such as a CD or DVD reader, a TV, etc., over a wire connection, together with a power supply unit 54 for connecting to a power outlet for powering the active loudspeaker.

The assembly is organized around a master central processor unit (MCU) 56 associated with a memory 58, including a microcontroller and digital signal processor circuit. The central unit 56 is interfaced with a Bluetooth module 60 connected to the antenna 50 via a UART connection 62. The Bluetooth module serves to establish connections with all of the other loudspeakers of the system, and also with peripherals that constitute audio sources and/or remote controls, in compliance with the Bluetooth interface specifications that specify, amongst other things, the possibility of sending control signals and data files, in particular audio data files in the form of streaming to a remote device. Still according to those specifications, the presence of a Bluetooth object in range of the module is detected in a manner that is entirely automatic, without the user being required to take any action in order to activate the link between the object and the Bluetooth module, which link should become operational solely by the fact of the peripheral coming within range of the circuit—and in the present example, providing the Bluetooth object is a peripheral that presents a profile that is compatible, i.e. an A2DP profile and/or an AVRCP profile. This detection is performed continuously by the module 60 as a background task.

The central unit 56 is also connected to the control unit 40 (pushbuttons 44, 46, and 48, indicator light 42), over a GPIO link 64.

It is also connected via an output to a digital-to-analog converter 66 and an input to an analog-to-digital converter 68, via a universal link bus 70, e.g. of the Inter-Ic Sound (I2S) type. The output converter 66 controls amplifiers 72, 74 whose own outputs are connected respectively to the loudspeaker 34 and the tweeter 36. The input converter 68 is connected to the terminals 52 via a line input circuit 76 in order to digitize the analog signals received on the input terminals 52.

The amplifiers 72 and 74 are preferably specific to each of the loudspeakers, i.e. there are as many amplifiers as there are loudspeakers in the enclosure, each associated with highpass/lowpass input filtering, preferably digital filtering performed in the stage 66 prior to conversion. The digital filtering may advantageously be performed by software and thus in a manner that is very inexpensive, not requiring any specific hardware components, without any risk of degrading sound quality by interposing an analog filter, and with it being possible to perform equalization and to adapt the response curve of each channel as a function of its loudspeaker. For example the cutoff frequency may be selected to be 3 kilohertz (kHz), with the amplifier 72 operating in the 20 hertz (Hz) to 3 kHz band and the amplifier 74 in the 3 kHz-20 kHz band.

The audio stream is processed in compliance with the functional diagram of FIG. 6 which shows the various software modules implemented for continuously broadcasting the audio stream.

The application module 80 provides the user interface and is itself interfaced with a network management module 82, a Bluetooth transmit/receive module 84, and modules 86 to 94 for audio signal processing.

The module 86 is a module forming an audio codec for decoding the stream received by the module 84, and in particular for separating the various channels of the multichannel audio stream: right and left channels, front and back channels, etc. and also serving to manage service information that is optionally encapsulated in the audio stream.

The module 88 serves to apply appropriate digital equalization to the signal, in particular for taking account of the specific response curves of the loudspeakers in the enclosure.

The module 90 is a digital filter for separating the two channels, base/medium and treble, that are to be reproduced by the respective loudspeakers in the enclosure. The data for reproduction is applied to an output buffer 92 and then to the digital-to-analog converter 94 prior to being directed to the respective amplifiers and loudspeakers.

FIG. 7 is a block diagram showing the various elements in the loudspeaker 10 involved in audio stream reproduction.

A line input module 102 receives signals from an appliance connected by a conventional wire connection, delivering a signal that is applied to the analog-to-digital converter 104. The other sources communicate via a wireless connection with a Bluetooth stack 106 feeding an audio decoder 108. The block 110 separates the channels, right and left for a two-loudspeaker stereo set. The right channel for reproduction by another loudspeaker is encoded by the block 112 and then sent to the other loudspeaker via the Bluetooth stack 114. The left channel for reproduction by the loudspeaker 10 is subjected to equalization processing 116, possibly to mixing of the right and left channels when the system is operating in degraded mode (i.e. when communication with the right loudspeaker is not or is not yet possible). Two digital filters 120, 122 separate the bands to be reproduced by the respective loudspeakers 34, 36 via the amplifiers 72, 74.

In some circumstances, it is possible to implement a simplified version, both in terms of hardware and software, as shown in FIGS. 8 and 9 which correspond respectively to FIGS. 5 and 7 described above.

They have the same elements with the exception of the line input circuits 52, 68, and 76, and the control unit 40.

Otherwise the hardware configuration is similar.

Such a loudspeaker is suitable for use in particular for satellite loudspeakers where it is certain they will never be used as a network head loudspeaker for communicating with an external peripheral. It is then possible to save on audio encoding circuits and the various algorithms for configuring and managing the network.

Thus, with reference to FIG. 9, the received signals are applied via Bluetooth stack 124 to the stage 126 that performs decoding that is the inverse of the encoding performed by the stage 112 of the network head loudspeaker. If the right/left channels were not separated by the network head, this separation is performed by a block 128. The equalizer and filter stages 130, 132, and 134 are identical to the corresponding stages 116, 120, and 122 of the loudspeaker 10.

The invention claimed is:

1. A system for distributing audio signals between a plurality of active loudspeakers for playing back said signals by the respective loudspeakers, the system comprising:
   at least two active loudspeakers, each active loudspeaker including:
      acoustic transducer means;
      associated amplifier means;
      wireless interface means comprising transmitter and receiver means suitable for searching for and establishing a wireless link with at least one other loudspeaker of the system;
      means for applying an audio channel signal to the amplifier means for playback by the transducer means, the audio channel signal being derived from the signal received by the wireless interface means; and
   means for configuring the loudspeakers in a network, wherein said loudspeakers are initially not configured in a hierarchical network;
   said transmitter and receiver means of each of said active loudspeakers are configured for searching for and establishing a wireless link with any other active loudspeaker of the system; and said configuring means configuring the loudspeakers into a network that operates automatically:
      a) enabling each loudspeaker to search for the other loudspeakers with which it can establish a direct wireless link;
      b) on the basis of the results of said search, drawing up a table of mutual visibilities of each active loudspeaker with respect to the other active loudspeakers for which a link has been successfully established;
      c) designating one of the loudspeakers as a network head loudspeaker; and
      d) on the basis of the mutual visibility table, defining a network topology that is hierarchical from the network head loudspeaker.

2. The system of claim 1, in which the automatic configuration means are also suitable for:
   e) making at least one loudspeaker suitable for searching for and establishing a wireless link with a remote peripheral that is capable of transmitting an encoded multichannel audio signal and/or a control signal, the other loudspeakers being designated as dependent loudspeakers.

3. The system of claim 2, in which said loudspeaker suitable for searching for and establishing a wireless link with a remote peripheral is the network head loudspeaker.

4. The system of claim 2, in which the automatic configuration means are also suitable for:
f) making the dependent loudspeakers unsuitable for searching for and establishing a wireless link with a remote peripheral capable of transmitting a coded multichannel audio signal and/or a control signal.

5. The system of claim 2, in which the automatic configuration means are also suitable for:
g) on the basis of the hierarchical network topology, defining for the network a directed graph for broadcasting audio signals to be reproduced by the system of loudspeakers, said broadcasting being performed from the head loudspeaker towards the other loudspeakers of the network either directly from said head loudspeaker, or indirectly with signals being relayed by one or more other loudspeakers of the network.

6. The system of claim 5, in which the system can occupy as alternatives two functional states, namely:
an in-use state in the presence of audio signals broadcast within the network; and
a ready state in the absence of audio signals broadcast within the network;
and in which the automatic configuration means are inhibited while the system is in the in-use state.

7. The system of claim 5, in which said audio signals broadcast over the network are audio signals encapsulated in digital data messages further including message routing data determined from said broadcast graph defined by the configuration means.

8. The system of claim 7, in which the loudspeakers are individualized by respective addresses, said message routing data comprising the address of the loudspeaker transmitting the message, the address of the destination loudspeaker for the message, and a flag specifying whether the destination loudspeaker is to reproduce the audio signals or is to relay them to one or more other loudspeakers of the network.

9. The system of claim 5, in which said audio signals broadcast over the network are multichannel audio signals, and in which the loudspeakers include means for extracting from the multichannel audio signal they receive, the audio channel signal for which they are the destination, for applying said signal of the audio channel to the amplifier means, and optionally for relaying the other audio channel signals to at least one other loudspeaker of the system.

10. The system of claim 1, in which the automatic configuration means are means activated on request by pressing on a button of a loudspeaker, and/or are means activated on each occasion the power supply circuits of a loudspeaker are switched on.

11. The system of claim 1, in which the automatic configuration means are also suitable, in the event of configuration failing, for activating the system in a degraded mode in which a plurality of different audio channel signals are initially combined with one another and are then broadcast to a reduced number of network loudspeakers for playing back by the transducer means thereof.

12. The system of claim 1, further comprising:
means for evaluating the relative transfer times of the audio channel signals to the various respective loudspeakers of the system; and
time shift means for applying to at least some of the audio channel signals respective delays suitable for compensating the differences between the evaluated relative transfer times.

13. The system of claim 1, in which at least one of the loudspeakers of the network further includes wire connection means for connection to a source of audio signals, and analog-to-digital converter means for converting them into a corresponding digital audio signal.

14. The system of claim 1, further including system control means suitable for receiving a control signal from a peripheral and for responding thereto by performing corresponding actions modifying operating parameters of the system, including: selecting one audio signal source from a plurality of sources that are simultaneously active; varying the overall volume or the relative volume of the signals played back by the transducer means of the various loudspeakers of the system; and/or temporarily muting the sound.

15. The system of claim 1, in which the means suitable for designating one of the loudspeakers as the network head loudspeaker operates as a function of predetermined criteria comprising one or more of the following criteria: MAC address number; possibility of setting up a direct link between the head loudspeaker and each of the other loudspeakers of the network; searching for the simplest network topology; the acoustic role of the loudspeaker in the network.

16. The system of claim 1, in which the means suitable for designating one of the loudspeakers as the network head loudspeaker are means suitable for dynamically redesignating the head loudspeaker in the event of a change in said mutual visibilities of the loudspeakers and/or of said predetermined criteria.

17. The system of claim 1, in which the means in each loudspeaker suitable for searching for the other loudspeakers with which a wireless link can be established directly comprise means for mutual authentication between the loudspeakers.

18. The system of claim 17, in which the mutual authentication means of the loudspeakers are means of the public key algorithm type in which the public key and the private key are predetermined and common to all of the loudspeakers of the system.

19. A system for distributing audio signals between a plurality of active loudspeakers for playing back said signals by the respective loudspeakers,
the system comprising at least two active loudspeakers each having:
acoustic transducer means;
associated amplifier means;
wireless interface means comprising transmitter and receiver means suitable for searching for and establishing a wireless link with any other loudspeaker of the system;
means for applying an audio channel signal to the amplifier means for playback by the transducer means, the audio channel signal being derived from the signal received by the wireless interface means; and
means for configuring the loudspeakers in a network;
the loudspeakers are initially configured between one another relative to the network in a non-hierarchical manner; and
the configuration means for configuring the loudspeakers into a network are means that operate automatically and that are suitable for:
a) enabling each loudspeaker to search for the other loudspeakers with which it can establish a direct wireless link;
b) on the basis of the results of said search, drawing up a mutual visibility table for each loudspeaker with the others;

c) designating one of the loudspeakers as a network head loudspeaker; and
d) on the basis of the mutual visibility table, defining a network topology that is hierarchical from the head loudspeaker as designated in this way, wherein the automatic configuration means is configured for:
e) making at least one loudspeaker suitable for searching for and establishing a wireless link with a remote peripheral that is capable of transmitting an encoded multi-channel audio signal and/or a control signal, the other loudspeakers being designated as dependent loudspeakers;

f) receiving from a dependent loudspeaker an order to swap roles and for transmitting said order to the head loudspeaker; and
g) for temporarily attributing dependent loudspeaker status to the head loudspeaker, temporarily attributing head loudspeaker status to the dependent loudspeaker that issued the role swapping order, and adapting the directed broadcast graph accordingly.

* * * * *